United States Patent
Negishi

(10) Patent No.: US 8,883,664 B2
(45) Date of Patent: Nov. 11, 2014

(54) OPTICAL GLASS, PRESS-MOLDING GLASS MATERIAL, AND OPTICAL ELEMENT AND METHOD OF THE SAME

(75) Inventor: Tomoaki Negishi, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 224 days.

(21) Appl. No.: 13/449,848

(22) Filed: Apr. 18, 2012

(65) Prior Publication Data
US 2012/0270719 A1 Oct. 25, 2012

(30) Foreign Application Priority Data

Apr. 19, 2011 (JP) ................................. 2011-093273
Mar. 13, 2012 (JP) ................................. 2012-055305

(51) Int. Cl.
C03C 3/14 (2006.01)
C03C 3/15 (2006.01)
C03C 3/155 (2006.01)
C03C 3/064 (2006.01)
C03C 3/068 (2006.01)
C03C 3/066 (2006.01)

(52) U.S. Cl.
CPC ............. *C03C 3/068* (2013.01); *C03C 3/066* (2013.01); *C03C 3/064* (2013.01); *C03C 3/155* (2013.01); *C03C 3/14* (2013.01); *C03C 3/15* (2013.01)
USPC .................. 501/49; 501/50; 501/51; 501/77; 501/78; 501/79

(58) Field of Classification Search
CPC .............. C03C 3/14; C03C 3/15; C03C 3/155
USPC .............................. 501/49, 50, 51, 77, 78, 79
See application file for complete search history.

(56) References Cited

U.S. PATENT DOCUMENTS

| 8,003,556 | B2 * | 8/2011 | Suzuki et al. .................... 501/78 |
| 2004/0220041 | A1 * | 11/2004 | Isowaki et al. .................. 501/78 |
| 2006/0105900 | A1 * | 5/2006 | Kasuga et al. .................. 501/78 |
| 2007/0249480 | A1 * | 10/2007 | Kobayashi et al. ............. 501/78 |
| 2010/0271830 | A1 * | 10/2010 | Morisada ...................... 362/317 |
| 2011/0065564 | A1 * | 3/2011 | Fu .................................. 501/42 |
| 2012/0135199 | A1 * | 5/2012 | Satou et al. ................... 428/172 |

FOREIGN PATENT DOCUMENTS

WO    WO 2008050591 A1 *   5/2008

* cited by examiner

*Primary Examiner* — Anthony J Green
*Assistant Examiner* — Elizabeth A Bolden
(74) *Attorney, Agent, or Firm* — Sughrue Mion, PLLC

(57) ABSTRACT

An aspect of the present invention relates to optical glass, which is oxide glass comprising various cationic components in prescribed amounts without Pb, with a refractive index nd of 1.750 to 1.850, an Abbé number vd of 29.0 to 40.0, and a glass transition temperature of less than 630° C.

10 Claims, No Drawings

OPTICAL GLASS, PRESS-MOLDING GLASS MATERIAL, AND OPTICAL ELEMENT AND METHOD OF THE SAME

CROSS-REFERENCE TO RELATED APPLICATIONS

This application claims the benefit of priority under 35 USC 119 to Japanese Patent Application No. 2011-93273 filed on Apr. 19, 2011 and Japanese Patent Application No. 2012-55305 filed on Mar. 13, 2012, which are expressly incorporated herein by reference in their entirety.

BACKGROUND OF THE INVENTION

1. Field of the Invention

The present invention relates to optical glass, a press-molding glass material and an optical element which are comprised of the optical glass, and a method of manufacturing an optical element employing the press-molding glass material.

2. Discussion of the Background

In recent years, as image pickup devices have achieved ever greater functionality and become ever more compact, the demand for lenses made of high refractive index glass has increased. For example, the optical glasses disclosed in Document 1 (Japanese Unexamined Patent Publication (KOKAI) No. 2009-120485) and Document 2 (Japanese Unexamined Patent Publication (KOKAI) No. 2006-219365) or English language family members US2008/254965A1 and U.S. Pat. No. 7,897,531, which are expressly incorporated herein by reference in their entirety, are known as such lens materials.

However, based on investigation by the present inventor, conventional high refractive index glasses, including the optical glasses described in Documents 1 and 2, present various manufacturing problems. These include having a high glass transition temperature, which renders the glass unsuited to precision press molding; the necessity for a high annealing temperature, subjecting the annealing furnace to wear and tear; and having a high liquidus temperature, compromising manufacturing stability.

SUMMARY OF THE INVENTION

An aspect of the present invention provides for optical glass that is of high refractive index and is highly suitable to manufacturing, a press-molding glass material and an optical element which are comprised of the optical glass, and a method of manufacturing an optical element employing the press-molding glass material.

An aspect of the present invention relates to optical glass, which is oxide glass comprising, denoted as cation percentages:

$Si^{4+}$ 0 to 30%;
$B^{3+}$ 15 to 60%;
$Li^+$ 0 to 10%;
$Na^+$ 0 to 10%;
$K^+$ 0 to 15%;
$Mg^{2+}$ 0 to 20%;
$Ca^{2+}$ 0 to 15%;
$Sr^{2+}$ 0 to 20%;
$Ba^{2+}$ 0 to 20%;
$Zn^{2+}$ 13 to 40%;
$La^{3+}$ 0 to 11%;
$Gd^{3+}$ 0 to 10%;
$Y^{3+}$ 0 to 6%;
$Yb^{3+}$ 0 to 6%;
$Zr^{4+}$ 0 to 5%;
$Ti^{4+}$ 0 to 7%;
$Nb^{5+}$ 2 to 20%;
$Ta^{5+}$ 0 to 5%;
$W^{6+}$ 0 to 10%;
$Te^{4+}$ 0 to 5%;
$Ge^{4+}$ 0 to 5%;
$Bi^{3+}$ 0 to 5%; and
$Al^{3+}$ 0 to 5%;
wherein a combined content of $Si^{4+}$ and $B^{3+}$ ranges from 35 to 65%;
a cation ratio of a content of $B^{3+}$ to the combined content of $Si^{4+}$ and $B^{3+}$, $B^{3+}/(Si^{4+}+B^{3+})$, ranges from 0.3 to 1;
a combined content of $Li^+$, $Na^+$, and $K^+$ ranges from 0 to 20%;
a cation ratio of a content of $Zn^{2+}$ to a combined content of $Mg^{2+}$, $Ca^{2+}$, $Sr^{2+}$, $Ba^{2+}$, and $Zn^{2+}$, $Zn^{2+}/(Mg^{2+}+Ca^{2+}+Sr^{2+}+Ba^{2+}+Zn^{2+})$, ranges from 0.30 to 1;
a combined content of $La^{3+}$, $Gd^{3+}$, and $Y^{3+}$ ranges from 0 to 20%;
a combined content of $Ti^{4+}$, $Nb^{5+}$, $Ta^{5+}$, and $W^{6+}$ ranges from 10 to 20%;
a cation ratio of a content of $Ti^{4+}$ to a combined content of $Ti^{4+}$ and $Nb^{5+}$, $Ti^{4+}/(Ti^{4+}+Nb^{5+})$, ranges from 0 to 0.60;
a cation ratio of a combined content of $Ti^{4+}$ and $W^{6+}$ to a combined content of $Ti^{4+}$, $Nb^{5+}$, $Ta^{5+}$, and $W^{6+}$, $(Ti^{4+}+W^{6+})/(Ti^{4+}+Nb^{5+}+Ta^{5+}+W^{6+})$, ranges from 0 to 0.70;
and comprising no Pb, with a refractive index nd ranging from 1.750 to 1.850, an Abbé number vd ranging from 29.0 to 40.0, and a glass transition temperature of less than 630° C.

The optical glass may have a partial dispersion ratio, Pg,F, of equal to or lower than 0.600, the partial dispersion ratio being denoted as (ng−nF)/(nF−nc) with a refractive index ng at a g line, nF at an F line, and nc at a c line.

The optical glass may have a deviation, ΔPg,F, of a partial dispersion ratio, Pg,F, of equal to or lower than 0.02, wherein the ΔPg,F is calculated by the following equation:

$$\Delta Pg,F = Pg,F + (0.0018 \times vd) - 0.6483$$

and in the equation, Pg,F is a partial dispersion ratio denoted as (ng−nF)/(nF−nc) with a refractive index ng at a g line, nF at an F line, and nc at a c line, and vd is an Abbé number.

The optical glass may have a specific gravity of equal to or lower than 4.5.

The optical glass may have a liquidus temperature of lower than 1,100° C.

The wavelength λ70 of the optical glass may be equal to or lower than 450 nm. In this context, the λ70 is a wavelength at which light transmittance over a wavelength range of 280 to 700 nm is 70%.

The wavelength λ5 of the optical glass may be equal to or lower than 370 nm. In this context, the λ5 is a wavelength at which light transmittance over a wavelength range of 280 to 700 nm is 5%.

A further aspect of the present invention relates to a press-molding glass material, which is comprised of the above optical glass.

A still further aspect of the present invention relates to an optical element, which is comprised of the above optical glass.

A still further aspect of the present invention relates to a method of manufacturing an optical element, which comprises heating and precision press molding with a pressing mold the above press-molding glass material.

The present invention can provide optical glass with a high refractive index, a low glass transition temperature, and good manufacturing stability; a press-molding glass material and an optical element which are comprised of the optical glass;

and a method of manufacturing an optical element employing the above press-molding glass material.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

Optical Glass

The optical glass of the present invention is oxide glass comprising, denoted as cation percentages:
$Si^{4+}$ 0 to 30%;
$B^{3+}$ 15 to 60%;
$Li^+$ 0 to 10%;
$Na^+$ 0 to 10%;
$K^+$ 0 to 15%;
$Mg^{2+}$ 0 to 20%;
$Ca^{2+}$ 0 to 15%;
$Sr^{2+}$ 0 to 20%;
$Ba^{2+}$ 0 to 20%;
$Zn^{2+}$ 13 to 40%;
$La^{3+}$ 0 to 11%;
$Gd^{3+}$ 0 to 10%;
$Y^{3+}$ 0 to 6%;
$Yb^{3+}$ 0 to 6%;
$Zr^{4+}$ 0 to 5%;
$Ti^{4+}$ 0 to 7%;
$Nb^{5+}$ 2 to 20%;
$Ta^{5+}$ 0 to 5%;
$W^{6+}$ 0 to 10%;
$Te^{4+}$ 0 to 5%;
$Ge^{4+}$ 0 to 5%;
$Bi^{3+}$ 0 to 5%; and
$Al^{3+}$ 0 to 5%;
wherein a combined content of $Si^{4+}$ and $B^{3+}$ ranges from 35 to 65%;
a cation ratio of a content of $B^{3+}$ to the combined content of $Si^{4+}$ and $B^{3+}$, $B^{3+}/(Si^{4+}+B^{3+})$, ranges from 0.3 to 1;
a combined content of $Li^+$, $Na^+$, and $K^+$ ranges from 0 to 20%;
a cation ratio of a content of $Zn^{2+}$ to a combined content of $Mg^{2+}$, $Ca^{2+}$, $Sr^{2+}$, $Ba^{2+}$, and $Zn^{2+}$, $Zn^{2+}/(Mg^{2+}+Ca^{2+}+Sr^{2+}+Ba^{2+}+Zn^{2+})$, ranges from 0.30 to 1;
a combined content of $La^{3+}$, $Gd^{3+}$, and $Y^{3+}$ ranges from 0 to 20%;
a combined content of $Ti^{4+}$, $Nb^{5+}$, $Ta^{5+}$, and $W^{6+}$ ranges from 10 to 20%;
a cation ratio of a content of $Ti^{4+}$ to a combined content of $Ti^{4+}$ and $Nb^{5+}$, $Ti^{4+}/(Ti^{4+}+Nb^{5+})$, ranges from 0 to 0.60;
a cation ratio of a combined content of $Ti^{4+}$ and $W^{6+}$ to a combined content of $Ti^{4+}$, $Nb^{5+}$, $Ta^{5+}$, and $W^{6+}$, $(Ti^{4+}+W^{6+})/(Ti^{4+}+Nb^{5+}+Ta^{5+}+W^{6+})$, ranges from 0 to 0.70;
and comprising no Pb, with a refractive index nd ranging from 1.750 to 1.850, an Abbé number vd ranging from 29.0 to 40.0, and a glass transition temperature of less than 630° C.

The optical glass of the present invention will be described in greater detail below. Hereinafter, unless specifically stated otherwise, the symbol "%" is to be interpreted as meaning "cation %".

Glass Composition

The optical glass of the present invention is oxide glass. The chief anion component is $O^{2-}$. The $O^{2-}$ content is desirably equal to or greater than 95 anion %, preferably equal to or greater than 98 anion %, more preferably equal to or greater than 99 anion %, and still more preferably, 100 anion %.

The cationic components will be described next.

$Si^{4+}$ functions to increase the viscosity of the glass, enhance the stability of the glass, and increase the moldability of the glass. However, when more than 30% is incorporated, the refractive index drops, the glass transition temperature rises, and the precision press moldability and melt property deteriorate. Accordingly, the $Si^{4+}$ content is specified as 0 to 30%.

The upper limit of the $Si^{4+}$ content is desirably 20%, preferably 15%, more preferably 10%, still more preferably 9%, and yet still more preferably, 8%. The lower limit of the $Si^{4+}$ content is desirably 1%, preferably 2.0%, more preferably 3%, still more preferably 4%, and yet still more preferably, 5%.

$B^{3+}$ is a component that functions to enhance the stability of the glass, lower the liquidus temperature, and enhance glass moldability. However, when the content of $B^{3+}$ is less than 15%, the refractive index rises, the stability of the glass decreases, and the liquidus temperature rises, compromising manufacturing stability. When more than 60% is incorporated, the refractive index drops. Accordingly, the $B^{3+}$ content is specified as 15 to 60%.

The upper limit of the $B^{3+}$ content is desirably 55%, preferably 50%, more preferably 48%, still more preferably 47%, and yet still more preferably, 45%. The lower limit of the $B^{3+}$ content is desirably 20%, preferably 25%, more preferably 30%, still more preferably 35%, and yet still more preferably, 38%.

Both $Si^{4+}$ and $B^{3+}$ are glass network-forming components. When the combined content of $Si^{4+}$ and $B^{3+}$ is less than 35%, the refractive index rises but the Abbé number decreases, the stability of the glass diminishes, and the liquidus temperature rises. When the combined content of $Si^{4+}$ and $B^{3+}$ exceeds 65%, the refractive index drops and the Abbé number increases. Thus, the combined content of $Si^{4+}$ and $B^{3+}$ is specified as 35 to 65%.

The upper limit of the combined content of $Si^{4+}$ and $B^{3+}$ is desirably 60%, preferably 58%, more preferably 56%, still more preferably 54%, and yet still more preferably, 53%. The lower limit of the combined content of $Si^{4+}$ and $B^{3+}$ is desirably 38%, preferably 40%, more preferably 42%, still more preferably 44%, and yet still more preferably, 46%.

The combined content of $Si^{4+}$ and $B^{3+}$ is as stated above. However, when the cation ratio of the content of $B^{3+}$ to the above combined content ($B^{3+}/(Si^{4+}+B^{3+})$) is less than 0.3, the refractive index drops and the liquidus temperature rises. Thus, the cation ratio ($B^{3+}/(Si^{4+}+B^{3+})$) is specified as 0.3 to 1.

To enhance the stability of the glass, the upper limit of the cation ratio ($B^{3+}/(Si^{4+}+B^{3+})$) is desirably 0.99, preferably 0.97, more preferably 0.95, still more preferably 0.93, and yet still more preferably, 0.90. The lower limit of the cation ratio ($B^{3+}/(Si^{4+}+B^{3+})$) is desirably 0.40, preferably 0.50, more preferably 0.60, still more preferably 0.70, and yet still more preferably, 0.80.

$Li^+$ is a component that has the effects of greatly lowering the glass transition temperature and enhancing the melt property. However, when the content of $Li^+$ exceeds 10%, the refractive index and glass stability decrease. Accordingly, the content of $Li^+$ is specified as 0 to 10%. The $Li^+$ content desirably falls within a range of 0 to 8%, preferably within a range of 0 to 6%, more preferably within a range of 0 to 4%, and still more preferably, within a range of 0 to 2%.

$Na^+$ is also a component that has the effects of greatly lowering the glass transition temperature and enhancing the melt property. However, when the content of $Na^+$ exceeds 10%, the refractive index and the glass stability decrease. Accordingly, the content of $Na^+$ is specified as 0 to 10%. The content of $Na^+$ desirably falls within a range of 0 to 8%, preferably within a range of 0 to 6%, more preferably within a range of 0 to 4%, and still more preferably, within a range of 0 to 2%.

$K^+$ is also a component that has the effects of greatly lowering the glass transition temperature and enhancing the melt property. However, when the content of $K^+$ exceeds 15%, the refractive index and the glass stability decrease. Accordingly, the content of $K^+$ is specified as 0 to 15%. The content of $K^+$ desirably falls within a range of 0 to 10%, preferably within a range of 0 to 8%, more preferably within a range of 0 to 6%, still more preferably with a range of 0 to 4%, and yet still more preferably, within a range of 0 to 2%.

The contents of $Li^+$, $Na^+$, and $K^+$ are as stated above. However, when the combined content of $Li^+$, $Na^+$, and $K^+$ exceeds 20%, the refractive index and glass stability drop. Accordingly, the combined content of $Li^+$, $Na^+$, and $K^+$ is specified as 0 to 20%. The upper limit of the combined content of $Li^+$, $Na^+$, and $K^+$ is desirably 15%, preferably 10%, more preferably 6%, still more preferably 4%, and yet still more preferably, 2%. The lower limit of the combined content of $Li^+$, $Na^+$, and $K^+$ is desirably 0.1%, preferably 0.5%, and more preferably, 1.0%.

$Mg^{2+}$ is a component serving to enhance the melt property and lower the specific gravity. However, when the content of $Mg^{2+}$ exceeds 20%, the Abbé number increases, the glass stability decreases, and the liquidus temperature rises. Accordingly, the content of $Mg^{2+}$ is specified as 0 to 20%. The $Mg^{2+}$ content desirably falls within a range of 0 to 15%, preferably within a range of 0 to 15%, more preferably within a range of 0 to 10%, still more preferably within a range of 0 to 8%, yet still more preferably within a range of 0 to 6%, and further preferably, no $Mg^{2+}$ is incorporated.

$Ca^+$ is a component that functions to enhance the melt property and lower the specific gravity of the glass. However, when the quantity of Ca exceeds 15%, the Abbé number increases, the stability of the glass decreases, and the liquidus temperature rises. Accordingly, the $Ca^{2+}$ content is specified as 0 to 15%. The upper limit of the $Ca^{2+}$ content is desirably 12%, preferably 10%, more preferably 8%, still more preferably 6%, and yet still more preferably, 4%. The lower limit of the $Ca^{2+}$ content is desirably 0.5%, preferably 1%, and more preferably, 2%.

$Sr^{2+}$ is a component that functions to enhance the melt property and increase the stability of the glass. However, when the content of $Sr^2$ exceeds 20%, the Abbé number increases and the stability of the glass decreases. Accordingly, the content of $Sr^{2+}$ is specified as 0 to 20%. The content of $Sr^{2+}$ desirably falls within a range of 0 to 15%, preferably within a range of 0 to 10%, more preferably within a range of 0 to 8%, still more preferably within a range of 0 to 6%, and further preferably, no $Sr^{2+}$ is incorporated.

$Ba^{2+}$ is a component that functions to enhance the melt property and increase the stability of the glass. However, when the content of $Ba^{2+}$ exceeds 20%, the Abbé number increases, the stability of the glass decreases, and the specific gravity increases. Accordingly, the content of $Ba^{2+}$ is specified as 0 to 20%. The upper limit of the $Ba^{2+}$ content is desirably 15%, preferably 10%, more preferably 8%, still more preferably 6%, and yet still more preferably, 5%. The lower limit of the $Ba^{2+}$ content is desirably 0.5%, preferably 1%, more preferably 2%, and still more preferably, 3%.

$Zn^{2+}$ is a component that functions to enhance the melt property and lower the glass transition temperature while maintaining a high refractive index. However, when the $Zn^{2+}$ content is less than 13%, the glass transition temperature rises. Further, since the refractive index drops and the Abbé number increases, it becomes necessary to incorporate large quantities of $Ti^{4+}$, $Nb^{5+}$, $Ta^{5+}$, and $W^{6+}$, which function to raise the refractive index and lower the Abbé number. Although $Ti^{4+}$, $Nb^{5+}$, $Ta^{5+}$, and $W^{6+}$ are components that raise the refractive in index, they also increase the $\Delta Pg, F$ value, which is an index of the partial dispersion characteristic, described further below, and compromise precision press moldability. Accordingly, when the Zn content is less than 13%, the $\Delta Pg, F$ value indirectly rises and precision press moldability deteriorates. Additionally, when the content of $Zn^{2+}$ exceeds 40%, the stability of the glass deteriorates. Accordingly, the content of $Zn^{2+}$ is specified as 13 to 40%. The upper limit of the $Zn^{2+}$ content is desirably 35%, preferably 30%, more preferably 28%, still more preferably 25%, and yet still more preferably, 23%. The lower limit of the $Zn^{2+}$ content is desirably 14%, preferably 15%, more preferably 16%, and still more preferably, 18%.

The quantities of $Mg^{2+}$, $Ca^{2+}$, $Sr^{2+}$, $Ba^{2+}$, and $Zn^{2+}$ are as set forth above. However, when the cation ratio of the quantity of $Zn^{2+}$ to the combined content of $Mg^{2+}$, $Ca^{2+}$, $Sr^{2+}$, $Ba^{2+}$, and $Zn^{2+}$ ($Zn^{2+}/(Mg^{2+}+Ca^{2+}+Sr^{2+}+Ba^{2+}+Zn^{2+})$) is less than 0.30, the Abbé number increases, the glass stability decreases, and the liquidus temperature rises. Accordingly, the cation ratio of ($Zn^{2+}/(Mg^{2+}Ca^{2+}Sr^{2+}Ba^{2+}Zn^{2+})$) is specified as 0.30 to 1. The upper limit of the cation ratio of ($Zn^{2+}/(Mg^{2+}+Ca^{2+}+Sr^{2+}+Ba^{2+}+Zn^{2+})$) is desirably 0.98, preferably 0.95, more preferably 0.90, still more preferably 0.85, and yet still more preferably, 0.80. To enhance the stability of the glass and lower the liquidus temperature, the lower limit of the cation ratio of ($Zn^{2+}/(Mg^{2+}+Ca^{2+}+Sr^{2+}+Ba^{2+}+Zn^{2+})$) is desirably 0.40, preferably 0.50, more preferably 0.60, still more preferably, 0.65, and yet still more preferably, 0.70.

$La^{3+}$ is a component that increases the stability of the glass and raises the refractive index without increasing the $\Delta P,F$ value. However, then the content of $La^{3+}$ exceeds 11%, the refractive index and Abbé number rise, the stability of the glass drops, and the liquidus temperature, specific gravity, and glass transition temperature rise. Accordingly, the content of $La^{3+}$ is specified as 0 to 11%. The upper limit of $La^{3+}$ is desirably 10%, preferably 9%, more preferably 8%, still more preferably 7%, and yet still more preferably, 6%. The lower limit of the $La^{3+}$ content is desirably 0.5%, preferably 1%, more preferably 2%, and still more preferably, 3%.

$Gd^{3+}$ is a component that raises the refractive index without increasing the $\Delta Pg,F$ value. However, when the content of $Gd^{3+}$ exceeds 10%, the refractive index and the Abbé number increase, the stability of the glass decreases, and the liquidus temperature, specific gravity, and glass transition temperature rise. Accordingly, the $Gd^{3+}$ content is specified as 0 to 10%. The $Gd^{3+}$ content desirably falls within a range of 0 to 8%, preferably within a range of 0 to 6%, more preferably within a range of 0 to 4%, still more preferably within a range of 0 to 2%, and yet still more preferably, no $Gd^{3+}$ is incorporated.

$Y^{3+}$ is a component that raises the refractive index without increasing the $\Delta Pg,F$ value. However, when the content of $Y^{3+}$ exceeds 6%, the refractive index and the Abbé number increase, the stability of the glass decreases, and the liquidus temperature, specific gravity, and glass transition temperature rise. Accordingly, the $Y^{3+}$ content is specified as 0 to 6%. The $Y^{3+}$ content desirably falls within a range of 0 to 4%, preferably within a range of 0 to 3%, and more preferably, no $Y^{3+}$ is incorporated.

The $La^{3+}$, $Gd^{3+}$, and $Y^{3+}$ content are as set forth above. However, to achieve a desired refractive index and Abbé number, maintain the stability of the glass, suppress the increase of the liquidus temperature, the specific gravity, and the glass transition temperature, the combined content of $La^{3+}$, $Gd^{3+}$, and $Y^{3+}$ is specified as 0 to 20%. The upper limit of the combined content of $La^{3+}$, $Gd^{3+}$, and $Y^{3+}$ is desirably 12%, preferably 10%, more preferably 9%, still more preferably 8%, yet still more preferably 7%, and even more preferably, 6%. The lower limit of the combined content of $La^{3+}$, $Gd^{3+}$, and $Y^{3+}$ is desirably 0.5%, preferably 1%, more preferably 2%, and still more preferably, 3%.

$Yb^{3+}$ is a component that raises the refractive index without increasing the $\Delta Pg,F$ value. However, when the content of $Yb^{3+}$ exceeds 6%, the refractive index and the Abbé number increase, the stability of the glass decreases, and the liquidus temperature, specific gravity, and glass transition temperature rise. Accordingly, the $Yb^{3+}$ content is specified as 0 to 6%. The content of $Yb^{3+}$ desirably falls within a range of 0 to 4%, preferably within a range of 0 to 3%, and more preferably, no $Yb^{3+}$ is incorporated.

$Zr^{4+}$ is a component that functions to raise the refractive index. However, when the $Zr^{4+}$ content exceeds 5%, the stability of the glass drops and the liquidus temperature rises. Accordingly, the $Zr^{4+}$ content is specified as 0 to 5%. The upper limit of $Zr^{4+}$ is desirably 4%, preferably 3%, more preferably 2%, and still more preferably 1%. The lower limit of the $Zr^{4+}$ content is desirably 0.5%.

$Ti^{4+}$ is a component that raises the refractive index and lowers the Abbé number. However, when the content of $Ti^{4+}$ exceeds 7%, the refractive index rises, the Abbé number decreases, the $\Delta Pg,F$ value increase, the stability of the glass decreases, and precision press moldability deteriorates. The glass also develops coloration. Accordingly, the $Ti^{4+}$ content is specified as 0 to 7%. The upper limit of $Ti^{4+}$ is desirably 6%, preferably 5%, and more preferably, 4%. The lower limit of the $Ti^{4+}$ content is desirably 0.5%, preferably 1%, and more preferably, 2%.

$Nb^{5+}$ is a component that functions to raise the refractive index and lower the Abbé number. Its effect on lowering the $\Delta P,F$ value is more than that of $Ti^{4+}$ and $W^{6+}$. However, when the content of $Nb^{5+}$ is less than 2%, it becomes difficult to achieve desired optical characteristics, the $\Delta P,F$ value increases, the stability of the glass decreases, and the liquidus temperature rises. Additionally, when the content of $Nb^{5+}$ exceeds 20%, the refractive index rises, the Abbé number decreases, the stability of the glass diminishes, and the liquidus temperature rises. Accordingly, the $Nb^{5+}$ content is specified as 2 to 20%. The upper limit of $Nb^{5+}$ is desirably 18%, preferably 16%, more preferably 14%, still more preferably 13%, and yet still more preferably, 12%. The lower limit of the $Nb^{5+}$ content is desirably 4%, preferably 5%, more preferably 6%, still more preferably 8%, yet still more preferably 9%, and even more preferably, 10%.

$Ta^{5+}$ is a component that raises the refractive index, exhibiting lower dispersibility than other components that similarly raise the refractive index in the form of $Ti^{4+}$, $Nb^{5+}$, and $W^{6+}$. It has a greater reducing effect on the $\Delta P,F$ value than $Ti^{4+}$ and $W^{6+}$. However, when the content of $Ta^{5+}$ exceeds 5%, the refractive index rises, the stability of the glass decreases, and the liquidus temperature and the specific gravity increase. Accordingly, the $Ta^{5+}$ content is specified as 0 to 5%. The $Ta^{5+}$ content desirably falls within a range of 0 to 4%, preferably within a range of 0 to 3%, and more preferably, no $Ta^{5+}$ is incorporated.

$W^{6+}$ is a component that raises the refractive index and lowers the Abbé number. However, when the $W^{6+}$ content exceeds 10%, the refractive index, the $\Delta P,F$ value, and the specific gravity increase, the Abbé number decreases, the stability of the glass decreases, and precision press moldability deteriorates. The glass also develops coloration. Accordingly, the $W^{6+}$ content is specified as 0 to 10%. The $W^{6+}$ content desirably falls within a range of 0 to 8%, preferably within a range of 0 to 6%, more preferably within a range of 0 to 4%, still more preferably within a range of 0 to 3%, and yet still more preferably, no $W^{6+}$ is incorporated.

As set forth above, $Ti^{4+}$, $Nb^{5+}$, $Ta^{5+}$, and $W^{6+}$ are components that raise the refractive index and lower the Abbé number. However, when the combined content of $Ti^{4+}$, $Nb^{5+}$, $Ta^{5+}$, and $W^{6+}$ is less than 10%, it becomes difficult to produce a glass satisfying the desired optical characteristics. When the combined content exceeds 20%, the refractive index increases, the Abbé number decreases, the $\Delta P,F$ value increases, the stability of the glass decreases, and the liquidus temperature rises. The glass also develops coloration. Accordingly, the combined content of $Ti^{4+}$, $Nb^{5+}$, $Ta^{5+}$, and $W^{6+}$ is specified as 10 to 20%. The upper limit of the combined content of $Ti^{4+}$, $Nb^{5+}$, $Ta^{5+}$, and $W^{6+}$ is desirably 19%, preferably 18%, more preferably 17%, still more preferably 16%, and yet still more preferably, 15%. The lower limit of the combined content of $Ti^{4+}$, $Nb^{5+}$, $Ta^{5+}$, and $W^{6+}$ is desirably 11%, preferably 12%.

When the cation ratio of the content of $Ti^{4+}$ to the combined content of $Ti^{4+}$ and $Nb^{5+}$ ($Ti^{4+}/(Ti^{4+}+Nb^{5+})$) exceeds 0.60, the stability of the glass decreases, the liquidus temperature rises, the $\Delta P,F$ value increases, and precision press moldability decreases. Accordingly, the cation ratio ($Ti^{4+}/(Ti^{4+}+Nb^{5+})$) is specified as 0 to 0.60. The upper limit of the cation ratio ($Ti^{4+}/(Ti^{4+}+Nb^{5+})$) is desirably 0.55, preferably 0.51, more preferably 0.45, still more preferably 0.40, yet still more preferably 0.30, and even more preferably, equal to or lower than 0.20. To maintain the stability of the glass and inhibit a rise in the liquidus temperature, the lower limit of the cation ratio ($Ti^{4+}/(Ti^{4+}+Nb^{5+})$) is desirably 0.02, preferably 0.05, still more preferably 0.08, yet still more preferably 0.10, and even more preferably, 0.12.

When the cation ratio of the combined content of $Ti^{4+}$ and $W^{6+}$ to the combined content of $Ti^{4+}$, $Nb^{5+}$, $Ta^{5+}$, and $W^{6+}$ (($Ti^{4+}+W^{6+}$)/($Ti^{4+}+Nb^{5+}+Ta^{5+}+W^{6+}$)) exceeds 0.70, the ΔP,F value increases, the stability of the glass diminishes, the liquidus temperature rises, the glass develops coloration, and precision press moldability decreases. Accordingly, the cation ratio ($Ti^{4+}+W^{6+}$)/($Ti^{+}+Nb^{5+}+Ta^{5+}+W^{6+}$) is specified as 0 to 0.70. The upper limit of the cation ratio of (($Ti^{4+}+W^{6+}$)/($Ti^{4+}+Nb^{5+}+Ta^{5+}+W^{6+}$)) is desirably 0.60, preferably 0.50, more preferably 0.40, still more preferably 0.30, and yet still more preferably, 0.20. To maintain the stability of the glass and inhibit a rise in the liquidus temperature, the lower limit of the cation ratio of (($Ti^{4+}+W^{6+}$)/($Ti^{4+}+Nb^{5+}+Ta^{5+}+W^{6+}$)) is desirably 0.02, preferably 0.05, more preferably 0.08, still more preferably 0.10, and yet still more preferably, 0.12.

$Te^{4+}$ is a component that functions to raise the refractive index and increase the stability of the glass. However, when the content of $Te^{4+}$ exceeds 5%, the stability of the glass diminishes. Accordingly, the $Te^{4+}$ content is specified as 0 to 5%. The content of $Te^{4+}$ desirably falls within a range of 0 to 4%, preferably within a range of 0 to 3%. From the perspective of concern for the environment, it is desirable to reduce the quantity of $Te^{4+}$ employed, and preferable to employ no $Te^{4+}$.

$Ge^{4+}$ is a component that functions to raise the refractive index and enhance the stability of the glass. However, when the content thereof exceeds 5%, the stability of the glass diminishes. Accordingly, the content of $Ge^{4+}$ is specified as 0 to 5%. Among substances employed as glass components, $Ge^{4+}$ is one of the more expensive. Thus, from the perspective of preventing a rise in manufacturing costs, the quantity employed is desirably kept low. Accordingly, the range of the $Ge^{4+}$ content is desirably 0 to 4%, preferably 0 to 3%, and more preferably, no $Ge^{4+}$ is incorporated.

$Bi^{3+}$ is a component the functions to raise the refractive index and enhance the stability of the glass. However, when the content thereof exceeds 5%, the stability of the glass decreases and the glass exhibits a tendency to develop coloration. Precision press moldability also deteriorates. Accordingly, the $Bi^{3+}$ content is specified as 0 to 5%. The range of the $Bi^{3+}$ content desirably falls within a range of 0 to 4%, preferably within a range of 0 to 3%, and more preferably, no $Bi^{3+}$ is incorporated.

$Al^{3+}$ is a component that functions to enhance glass stability and chemical durability. However, when more than 5% is incorporated, the refractive index drops and the stability of the glass tends to diminish. Accordingly, the $Al^{3+}$ content is specified as 0 to 5%. The content of $Al^{3+}$ desirably falls within a range of 0 to 4%, preferably within a range of 0 to 3%, and more preferably, no $Al^{3+}$ is incorporated.

Clarifying agents in the form of Sb, Sn, and the like can be added to the optical glass of the present invention in addition to the components set forth above. In that case, the quantity of Sb added, as converted to $Sb_2O_3$ as a ratio relative to the total of the other components excluding the clarifying agents, is desirably 0 to 1 weight %, preferably 0 to 0.5 weight %, and the quantity of Sn added, as converted to $SnO_2$ as a ratio relative to the total of the other components excluding the clarifying agents, is desirably 0 to 1 weight %, preferably 0 to 0.5 weight %.

The glass of the present invention is optical glass and thus little coloration is desirable. Accordingly, it is desirable not to incorporate V, Cr, Mn, Cu, Ni, Fe, Pr, Nd, Eu, Tb, Ho, and Er, which impart coloration. To reduce the influence on the environment, the optical glass of the present invention contains no Pb. To further reduce the influence on the environment, it is desirable not to incorporate Cd, Th, U, Tl, Se, and As.

$Ga^{3+}$, $Lu^{3+}$, $In^{3+}$, and $He^{+}$ can be incorporated in small quantities. However, these components do not produce significant effects and are all expensive. Thus, the content of each is desirably kept to within a range of 0 to 2%, preferably within a range of 0 to 1%, more preferably within a range of 0 to less than 0.5%, still more preferably to within a range of 0 to less than 0.1%, and yet still more preferably, none is incorporated to keep down the cost of producing the glass.

In the present invention, the phrase "none is incorporated" or "not contained" means that none is added as a glass component, but does not exclude levels of impurities and the like that are unavoidably mixed into the glass.

Refractive Index and Abbé Number

The refractive index nd of the optical glass of the present invention is 1.750 to 1.850. By having a refractive index of equal to or higher than 1.750, it becomes possible to use the optical glass of the present invention to provide the optical elements that constitute highly functional and compact optical systems. However, as the refractive index of a high refractive index glass rises, the liquidus temperature and glass transition temperature tend to rise and manufacturing suitability decreases. Thus, the upper limit of the refractive index nd in the present invention is specified as 1.850 to maintain the moldability and manufacturing stability of the glass. Having a refractive index nd of equal to or lower than 1.850 is also effective in terms of inhibiting an increase in the specific gravity.

The upper limit of the refractive index nd is desirably 1.840, preferably 1.830, more preferably 1.825, still more preferably 1.820, yet still more preferably 1.815, and even more preferably, 1.810.

The lower limit of the refractive index nd is desirably 1.760, preferably 1.770, more preferably 1.780, still more preferably 1.790, yet still more preferably 1.795, and even more preferably, 1.800.

The optical glass of the present invention has an Abbé number vd falling within a range of 29.0 to 40.0 in addition to a refractive index falling within the range set forth above. Keeping the Abbé number vd within the above range makes it possible to achieve a good chromatic aberration correction function by combination with optical elements comprised of various optical glasses.

The upper limit of the Abbé number vd is desirably 38.0, preferably 37.0, more preferably 36.0, still more preferably 35.0, yet still more preferably 34.5, and even more preferably, 34.0.

The lower limit of the Abbé number vd is 30.0, preferably 31.0, more preferably 31.5, still more preferably 32.0, yet still more preferably 32.5, and even more preferably, 33.0.

Glass Transition Temperature

The glass transition temperature of the optical glass of the present invention is less than 630° C. The optical glass of the present invention, with a glass transition temperature of less than 630° C., makes it possible to inhibit a rise in the temperature of the glass and the temperature of pressing mold during press molding, yielding good press moldability.

The optical glass of the present invention comprises an essential component in the form of $Nb^{5+}$ and optional components in the form of $Ti^{4+}$, $Ta^{5+}$, and $W^{6+}$. During press molding, these components react with the molding surface of the pressing mold, compromise the quality of the surface of the press molded product, and aggravate deterioration of the molding surface. Such phenomena should be avoided, particularly in precision press molding. This reaction is greatly affected by the temperature of the glass and the pressing mold during press molding, and can thus be inhibited by lowering the press molding temperature. Accordingly, the optical glass of the present invention, in which a rise in the press molding temperature can be inhibited by a glass transition temperature of less than 630° C., is suited to precision press molding. The optical glass of the present invention, in which the glass transition temperature is less than 630° C., can also lend itself to the use of a lower annealing temperature, thereby inhibiting deterioration and wear and tear on the annealing furnace.

The upper limit of the glass transition temperature of the optical glass of the present invention is desirably 610° C., preferably 600° C., more preferably 590° C., still more preferably 580° C., and yet still more preferably, 570° C. When the glass transition temperature is made excessively low, the refractive index drops and there is a tendency for the glass to undergo deterioration in stability. Thus, the glass transition temperature is desirably equal to or higher than 500° C., preferably equal to or higher than 520° C., more preferably equal to or higher than 530° C., still more preferably equal to or higher than 540° C., and yet still more preferably, equal to or higher than 550° C.

Partial Dispersion

In image pickup optical systems, projection optical systems, and the like, combining a lens comprised of the optical glass of the present invention with a lens comprised of a glass of low dispersion is an effective way to achieve high-order chromatic aberration correction. However, many glasses on the low dispersion side have high partial dispersion ratios. Thus, when conducting higher-order chromatic aberration correction, the optical glass of the present invention that is combined with lenses made of low dispersion glasses is desirable to have a low partial dispersion ratio.

The partial dispersion ratio Pg,F is denoted using the various refractive indexes ng, nF, nc at the g line, F line, and c line as (ng−nF)/(nF−nc).

To provide a glass that is suited to high-order chromatic aberration correction, the partial dispersion ratio Pg,F in the optical glass of the present invention is desirably equal to or lower than 0.600, preferably equal to or lower than 0.598, more preferably equal to or lower than 0.596, still more preferably equal to or lower than 0.594, yet still more preferably equal to or lower than 0.592, and even more preferably, equal to or lower than 0.590.

However, an excessively low partial dispersion ratio Pg,F tends to cause other characteristics to deviate from their desired ranges. Thus, the partial dispersion ratio Pg,F is desirably equal to or higher than 0.570. The lower limit of the partial dispersion ratio Pg,F is preferably 0.575, more preferably 0.580, still more preferably 0.582, yet still more preferably 0.584, and even more preferably, 0.586.

In a plot of the partial dispersion ratio Pg,F against the Abbé number vd, when the partial dispersion ratio on the normal line that is the reference for a normal partial dispersion glass is denoted as Pg,F(0), Pg,F(0) can be denoted by the following equation using the Abbé number vd:

$$Pg,F(0) = 0.6483 − (0.0018 \times vd)$$

ΔPg,F is the deviation of the partial dispersion ratio Pg,F from the above normal line and is given by the following equation:

$$\Delta Pg, F = Pg, F − Pg, F(0)$$
$$= Pg, F + (0.0018 \times vd) − 0.6483$$

In a desirable form of the optical glass of the present invention, the deviation ΔPg,F is equal to or lower than 0.02, making it suitable as an optical element material for use in high-order correction of chromatic aberration. In the present invention, ΔPg,F desirably falls within a range of equal to or lower than 0.015, preferably within a range of equal to or lower than 0.01, more preferably within a range of equal to or lower than 0.008, still more preferably within a range of equal to or lower than 0.006, and yet still more preferably, within a range of equal to or lower than 0.005.

Specific Gravity

The optical glass of the present invention is a high refractive index glass with a refractive index nd falling within a range of 1.750 to 1.850. In general, the specific gravity of a glass tends to increase with the increase of the refractive index. However, an increase in specific gravity is undesirable because it invites an increase in the weight of optical elements. In this regard, by having the, glass composition set forth above, the optical glass of the present invention can achieve a specific gravity of equal to or lower than 4.5 in a high refractive index glass. In the optical glass of the present invention, the upper limit of the specific gravity is desirably 4.4, preferably 4.3, more preferably 4.2, and still more preferably, 4.1. Conversely, when the specific gravity is made excessively low, the stability of the glass decreases and there is a tendency for the liquidus temperature to rise. Thus, the specific gravity is desirably equal to or higher than 3.5, preferably equal to or higher than 3.6, more preferably equal to or higher than 3.7, still more preferably equal to or higher than 3.8, and yet still more preferably, equal to or higher than 3.9.

Liquidus Temperature

By having the glass composition set forth above, the optical glass of the present invention can exhibit a liquidus temperature of less than 1,100° C. Since rises in the melting temperature and the temperature at which the glass melt flows out can be inhibited, it becomes possible to achieve a high refractive index as well as both high homogeneity and the suppression of coloration.

In the present invention, the liquidus temperature is desirably equal to or lower than 1,090° C., preferably equal to or lower than 1,070° C., more preferably equal to or lower than 1,050° C., still more preferably equal to or lower than 1,040° C., and yet still more preferably, equal to or lower than 1,030° C.

In addition, an excessively low liquidus temperature makes it difficult to achieve the desired refractive index and Abbé number. Further, the value of the partial dispersion ratio Pg,F rises. Accordingly, the liquidus temperature is desirably equal to or higher than 950° C., preferably equal to or higher than 970° C., more preferably equal to or higher than 980° C., still more preferably equal to or higher than 990° C., and yet still more preferably, equal to or higher than 1,000° C.

Coloration (λ70, λ5)

By having the glass composition set forth above, the optical glass of the present invention makes it possible to reduce or inhibit coloration, thereby achieving high optical transparency over a broad range of the visible light region. The wavelength λ70 at which light transmittance over the wavelength range of 280 to 700 nm is 70% and the wavelength λ5 at which this same light transmittance is 5% can be employed as the indexes of coloration of an optical glass. In this context, the light transmittance is the spectral transmittance obtained by directing light in a direction perpendicular to the polished surfaces of a glass sample having mutually parallel surfaces that have been polished to a thickness of 10.0±0.1 mm. That is, denoting the intensity of the light entering the sample as Iin and the intensity of the light passing through the sample as Iout, it is given by Iout/Iin. The spectral transmittance includes losses due to reflection of light off the sample surface. The above polishing means smoothing to a state of adequately low surface roughness relative to the wavelength of the measurement wavelength region. For λ70, the optical glass of the present invention can exhibit a λ70 of equal to or lower than 450 nm. The λ70 of the optical glass of the present invention is desirably equal to or lower than 440 nm, preferably equal to or lower than 430 nm, more preferably equal to or lower than 420 nm, still more preferably equal to or lower than 410 nm, and yet still more preferably, equal to or lower than 400 nm. However, an excessively low λ70 makes it difficult to satisfy the desired optical characteristics, the stability of the glass decreases, and the liquidus temperature sometimes tends to rise. The λ70 is desirably equal to or higher than 350 nm, preferably equal to or higher than 360 nm, more preferably equal to or higher than 370 nm, still more preferably equal to or higher than 380 nm, and yet still more preferably, equal to or higher than 390 nm.

The λ5 of the optical glass of the present invention desirably falls within a range of equal to or lower than 370 nm, preferably within a range of equal to or lower than 365 nm, more preferably within a range of equal to or lower than 360 nm, still more preferably within a range of equal to or lower than 355 nm, and yet still more preferably within a range of equal to or lower than 350 nm.

As set forth above, the optical glass of the present invention can exhibit good optical transparency in a high refractive index glass, and is suitable as a material for optical elements constituting image pickup optical systems and projection optical systems.

Method of Manufacturing Optical Glass

The optical glass of the present invention can be manufactured by the melt method. In the melt method, stating materials in the form of oxides and various salts are weighed out so as to yield glass of desired composition and optical characteristics, and mixed to obtain a mixed starting material. The mixed starting material is heated and melted. The melt obtained is clarified, homogenized, and made to flow out to obtain formed articles comprised of homogeneous glass. Alternatively, the mixed starting material can be charged to a crucible and roughly melted to vitrify the glass, from which cullets are prepared. The cullet starting materials are then blended so as to obtain an optical glass of desired optical characteristics, heated, and melted. The melt obtained can then be clarified, homogenized, and made to flow out to obtain formed articles comprised of homogenous glass.

Press-Molding Glass Material

The press-molding glass material, that is a glass material for press molding, of the present invention (referred to as the "glass material" hereinafter) is comprised of the above optical glass of the present invention.

The glass material can be prepared by first preparing formed glass articles by heating, melting, and forming glass starting materials that have been blended to yield the optical glass of the present invention. The formed glass articles are then processed to prepare a glass material corresponding to the quantity of one press molded article.

As an example, the glass melt is cast into a mold, molded into plate or block form, and annealed. It can then be mechanically processed—that is, cut, ground, and polished—to obtain a glass material.

Alternatively, the glass melt can be made to flow out of pipe, a gob of glass melt corresponding to the quantity of one press molded article can be separated from the tip of the glass melt flow, and the glass melt gob can be molded into a glass material on a forming mold. In that case, it is possible to mold the glass gob into a glass material while being floated with blown air on the mold, or to press mold the glass melt gob on the mold and then cooled while being floated with blown air to prepare a glass material.

Optical Element and Method of Manufacturing the Same

The optical element of the present invention is comprised of the optical glass of the present invention.

Specific examples of the optical element of the present invention are lenses such as aspherical lenses, spherical lenses, lenses one surface of which is a flat surface and the other surface of which is a concave, lenses one surface of which is a flat surface and the other surface of which is a convex, lenses both surface of which is a concave, lenses both surface of which are a convex, convex meniscus lenses, and concave meniscus lenses; various lenses such as microlenses, lens arrays, and lenses with diffraction gratings; prisms; and prisms with lens functions. Antireflective films, wavelength-selective partially reflective films, and the like can be provided as needed on lens surfaces.

The optical element of the present invention can achieve both a high refractive index and a low partial dispersion ratio. Thus, by combination with optical elements comprised of other glasses, good chromatic aberration correction can be achieved. Further, since the optical glass of the present invention can achieve both a high refractive index and a low specific gravity, the weight reduction of optical elements can be achieved with the optical glass of the present invention. The optical element of the present invention is suited to the image pickup optical systems of various cameras, such as digital still cameras, digital video cameras, monitor cameras, and vehicle-mounted cameras; and optical elements directing light for the reading and writing of data on optical recording media such as DVDs and CDs. For example, it is suited to optical pickup lenses and collimator lenses. It is also suitable as an optical element for optical communication.

The method of manufacturing an optical element of the present invention comprises heating the press-molding glass material of the present invention and precision press molding it to obtain an optical element. In this context, the term "precision press molding", also widely known as mold optics molding, refers to a method of forming the optically functional surface of an optical element by transferring the molding surface of a pressing mold. The term "optically functional surface" refers to a surface on an optical element that bends, reflects, diffracts, admits, or emits light that is being controlled. An optically functional surface corresponds to a lens surface in the case of a lens. The use of a glass material comprised of the optical glass of the present invention having good precision press moldability permits the manufacturing with high productivity of high-quality optical elements by the application of known precision press molding methods.

The optical element of the present invention can also be fabricated by methods other than precision press molding. For example, the glass material can be melted by heating and press molded to obtain an optical element blank having the shape of an optical element with grinding and polishing allowances. The optical element blank can then be ground and polished to fabricate an optical element. Alternatively, a molded glass article comprised of the optical glass of the present invention can be ground and polished to obtain an optical element.

EXAMPLES

The present invention will be described in greater detail below through Examples.

1. Preparation of Optical Glass

Starting materials for incorporating various components, in the form of corresponding oxides, carbonates, sulfates, nitrates, hydroxides, and the like, were weighed out to yield the glass composition shown in Table 1 and thoroughly mixed to obtain a mixed starting material. This was charged to a platinum crucible, heated for 1 to 3 hours at 1,200 to 1,350° C., melted, clarified, and homogenized. The glass melt obtained was made to flow into a carbon mold, cooled to the glass transition temperature, and then immediately placed in an annealing furnace. After annealing for about 1 hour to within the glass transition temperature range, the glass was cooled to room temperature within the furnace to obtain optical glass. Observation by a microscope revealed that no crystals had precipitated in the optical glass obtained. Table 1 gives the characteristics of the optical glasses thus obtained.

TABLE 1

| No. | | $Si^{4+}$ | $B^{3+}$ | $Li^+$ | $Na^+$ | $K^+$ | $Mg^{2+}$ | $Ca^{2+}$ | $Sr^{2+}$ | $Ba^{2+}$ | $Zn^{2+}$ | $La^{3+}$ | $Gd^{3+}$ | $Y^{3+}$ | $Yb^{3+}$ | $Zr^{4+}$ | $Ti^{4+}$ | $Nb^{5+}$ | $Ta^{5+}$ | $W^{6+}$ | $Ta^{4+}$ | $Ga^{4+}$ | $Bi^{3+}$ | $Al^{3+}$ | Total |
|---|---|---|---|---|---|---|---|---|---|---|---|---|---|---|---|---|---|---|---|---|---|---|---|---|---|
| 1 | cationic % | 20.33 | 25.59 | 1.48 | 0.00 | 0.00 | 0.00 | 9.09 | 0.00 | 3.81 | 21.76 | 4.10 | 0.00 | 0.00 | 0.00 | 0.93 | 4.56 | 8.35 | 0.00 | 0.00 | 0.00 | 0.00 | 0.00 | 0.00 | 100.00 |
| 2 | cationic % | 12.22 | 33.70 | 1.48 | 0.00 | 0.00 | 0.00 | 9.09 | 0.00 | 3.81 | 21.76 | 4.10 | 0.00 | 0.00 | 0.00 | 0.93 | 4.56 | 8.35 | 0.00 | 0.00 | 0.00 | 0.00 | 0.00 | 0.00 | 100.00 |
| 3 | cationic % | 6.22 | 39.70 | 1.48 | 0.00 | 0.00 | 0.00 | 9.09 | 0.00 | 3.81 | 21.76 | 4.10 | 0.00 | 0.00 | 0.00 | 0.93 | 4.56 | 8.35 | 0.00 | 0.00 | 0.00 | 0.00 | 0.00 | 0.00 | 100.00 |
| 4 | cationic % | 6.42 | 40.94 | 1.52 | 0.00 | 0.00 | 0.00 | 9.37 | 0.00 | 3.92 | 22.43 | 4.23 | 0.00 | 0.00 | 0.00 | 0.96 | 1.61 | 8.60 | 0.00 | 0.00 | 0.00 | 0.00 | 0.00 | 0.00 | 100.00 |
| 5 | cationic % | 6.22 | 39.71 | 1.48 | 0.00 | 0.00 | 0.00 | 9.09 | 0.00 | 0.00 | 25.56 | 4.10 | 0.00 | 0.00 | 0.00 | 0.93 | 4.58 | 8.35 | 0.00 | 0.00 | 0.00 | 0.00 | 0.00 | 0.00 | 100.00 |
| 6 | cationic % | 6.49 | 41.41 | 1.54 | 0.00 | 0.00 | 0.00 | 9.48 | 0.00 | 1.88 | 24.77 | 0.00 | 0.00 | 0.00 | 0.00 | 0.97 | 4.76 | 8.70 | 0.00 | 0.00 | 0.00 | 0.00 | 0.00 | 0.00 | 100.00 |
| 7 | cationic % | 6.22 | 43.51 | 1.48 | 0.00 | 0.00 | 0.00 | 9.09 | 0.00 | 3.81 | 21.76 | 4.10 | 0.00 | 0.00 | 0.00 | 0.93 | 4.56 | 8.35 | 0.00 | 0.00 | 0.00 | 0.00 | 0.00 | 0.00 | 100.00 |
| 8 | cationic % | 6.22 | 43.70 | 1.48 | 0.00 | 0.00 | 0.00 | 5.09 | 0.00 | 3.81 | 21.76 | 4.10 | 0.00 | 0.00 | 0.00 | 0.93 | 1.56 | 11.35 | 0.00 | 0.00 | 0.00 | 0.00 | 0.00 | 0.00 | 100.00 |
| 9 | cationic % | 6.22 | 43.70 | 1.48 | 0.00 | 0.00 | 0.00 | 5.09 | 0.00 | 3.81 | 21.76 | 4.10 | 0.00 | 0.00 | 0.00 | 0.93 | 6.56 | 6.35 | 0.00 | 0.00 | 0.00 | 0.00 | 0.00 | 0.00 | 100.00 |
| 10 | cationic % | 7.72 | 43.70 | 1.48 | 1.48 | 0.00 | 0.00 | 2.59 | 0.00 | 3.81 | 21.76 | 4.10 | 0.00 | 0.00 | 0.00 | 0.93 | 2.56 | 11.35 | 0.00 | 0.00 | 0.00 | 0.00 | 0.00 | 0.00 | 100.00 |
| 11 | cationic % | 7.72 | 43.70 | 0.00 | 0.00 | 1.48 | 0.00 | 2.59 | 0.00 | 3.81 | 21.76 | 4.10 | 0.00 | 0.00 | 0.00 | 0.93 | 2.56 | 11.35 | 0.00 | 0.00 | 0.00 | 0.00 | 0.00 | 0.00 | 100.00 |
| 12 | cationic % | 7.72 | 43.70 | 0.46 | 0.00 | 0.97 | 0.00 | 2.52 | 0.00 | 3.81 | 21.76 | 4.10 | 0.00 | 0.00 | 0.00 | 0.93 | 2.56 | 11.35 | 0.00 | 0.00 | 0.00 | 0.00 | 0.00 | 0.00 | 100.00 |
| 13 | cationic % | 7.50 | 42.45 | 0.46 | 0.00 | 0.97 | 0.00 | 2.52 | 0.00 | 3.69 | 21.12 | 3.98 | 0.00 | 0.00 | 0.00 | 0.90 | 2.49 | 11.01 | 0.00 | 2.91 | 0.00 | 0.00 | 0.00 | 0.00 | 100.00 |
| 14 | cationic % | 7.50 | 42.44 | 0.46 | 0.00 | 0.97 | 0.00 | 2.52 | 0.00 | 3.69 | 21.12 | 3.98 | 0.00 | 0.00 | 0.00 | 0.90 | 2.49 | 13.93 | 0.00 | 0.00 | 0.00 | 0.00 | 0.00 | 0.00 | 100.00 |
| 15 | cationic % | 7.50 | 42.45 | 0.46 | 0.00 | 0.97 | 0.00 | 2.52 | 0.00 | 3.69 | 21.12 | 3.98 | 0.00 | 0.00 | 0.00 | 0.90 | 2.49 | 11.45 | 0.00 | 0.00 | 0.00 | 0.00 | 0.00 | 0.00 | 100.00 |
| 16 | cationic % | 7.80 | 44.11 | 0.48 | 0.00 | 1.01 | 0.00 | 2.52 | 0.00 | 3.84 | 21.96 | 4.14 | 0.00 | 0.00 | 0.00 | 0.00 | 2.59 | 11.01 | 0.00 | 0.00 | 0.00 | 0.00 | 0.00 | 0.00 | 100.00 |
| 17 | cationic % | 7.57 | 42.86 | 0.47 | 0.00 | 0.98 | 0.00 | 2.54 | 0.00 | 3.73 | 21.33 | 4.02 | 0.00 | 0.00 | 0.00 | 2.87 | 2.51 | 11.12 | 0.00 | 0.00 | 0.00 | 0.00 | 0.00 | 0.00 | 100.00 |
| 18 | cationic % | 7.50 | 42.45 | 0.46 | 0.00 | 0.97 | 0.00 | 2.52 | 0.00 | 3.69 | 21.12 | 3.98 | 2.91 | 0.00 | 0.00 | 0.90 | 2.49 | 11.01 | 0.00 | 0.00 | 0.00 | 0.00 | 0.00 | 0.00 | 100.00 |
| 19 | cationic % | 7.29 | 41.22 | 0.45 | 0.00 | 0.94 | 0.00 | 2.45 | 0.00 | 3.59 | 20.53 | 3.87 | 5.66 | 0.00 | 0.00 | 0.88 | 2.42 | 10.70 | 0.00 | 0.00 | 0.00 | 0.00 | 0.00 | 0.00 | 100.00 |
| 20 | cationic % | 7.50 | 42.45 | 0.46 | 0.00 | 0.97 | 0.00 | 2.52 | 0.00 | 3.69 | 21.12 | 3.98 | 0.00 | 2.91 | 0.00 | 0.90 | 2.49 | 11.01 | 0.00 | 0.00 | 0.00 | 0.00 | 0.00 | 0.00 | 100.00 |
| 21 | cationic % | 7.50 | 42.44 | 0.46 | 0.00 | 0.97 | 0.00 | 2.52 | 0.00 | 3.69 | 21.12 | 3.98 | 0.00 | 0.00 | 2.91 | 0.90 | 2.49 | 11.01 | 0.00 | 0.00 | 0.00 | 0.00 | 0.00 | 0.00 | 100.00 |
| 22 | cationic % | 7.29 | 41.22 | 0.45 | 0.00 | 0.94 | 0.00 | 2.45 | 0.00 | 3.59 | 20.53 | 9.53 | 0.00 | 0.00 | 0.00 | 0.88 | 2.42 | 10.70 | 0.00 | 0.00 | 0.00 | 0.00 | 0.00 | 0.00 | 100.00 |
| 23 | cationic % | 7.72 | 43.70 | 0.48 | 0.00 | 1.00 | 0.00 | 2.58 | 0.00 | 3.81 | 21.76 | 2.10 | 2.00 | 0.00 | 0.00 | 0.93 | 2.56 | 11.35 | 0.00 | 0.00 | 0.00 | 0.00 | 0.00 | 0.00 | 100.00 |
| 24 | cationic % | 7.72 | 43.70 | 0.48 | 0.00 | 1.00 | 0.00 | 2.59 | 0.00 | 3.81 | 21.76 | 2.10 | 0.00 | 2.00 | 0.00 | 0.93 | 2.56 | 11.35 | 0.00 | 0.00 | 0.00 | 0.00 | 0.00 | 0.00 | 100.00 |
| 25 | cationic % | 7.96 | 45.06 | 0.49 | 0.00 | 1.03 | 0.00 | 2.67 | 0.00 | 3.92 | 19.34 | 4.14 | 0.00 | 0.00 | 0.00 | 0.96 | 2.64 | 11.70 | 0.00 | 0.00 | 0.00 | 0.00 | 0.00 | 0.00 | 100.00 |
| 26 | cationic % | 8.22 | 46.49 | 0.51 | 0.00 | 1.06 | 0.00 | 2.76 | 0.00 | 4.05 | 16.76 | 4.36 | 0.00 | 0.00 | 0.00 | 0.99 | 2.73 | 12.07 | 0.00 | 0.00 | 0.00 | 0.00 | 0.00 | 0.00 | 100.00 |
| 27 | cationic % | 7.29 | 41.22 | 0.45 | 0.00 | 0.94 | 0.00 | 2.45 | 0.00 | 3.59 | 26.19 | 3.87 | 0.00 | 0.00 | 0.00 | 0.88 | 2.42 | 10.70 | 0.00 | 0.00 | 0.00 | 0.00 | 0.00 | 0.00 | 100.00 |
| 28 | cationic % | 7.09 | 40.09 | 0.44 | 0.00 | 0.92 | 0.00 | 2.38 | 0.00 | 3.49 | 28.22 | 3.76 | 0.00 | 0.00 | 0.00 | 0.85 | 2.35 | 10.41 | 0.00 | 0.00 | 0.00 | 0.00 | 0.00 | 0.00 | 100.00 |
| 29 | cationic % | 7.50 | 42.44 | 0.46 | 0.00 | 0.97 | 0.00 | 2.52 | 0.00 | 6.61 | 21.12 | 3.98 | 0.00 | 0.00 | 0.00 | 0.90 | 2.49 | 11.01 | 0.00 | 0.00 | 0.00 | 0.00 | 0.00 | 0.00 | 100.00 |
| 30 | cationic % | 7.29 | 41.22 | 0.45 | 0.00 | 0.94 | 0.00 | 2.45 | 0.00 | 9.25 | 20.53 | 3.87 | 0.00 | 0.00 | 0.00 | 0.88 | 2.42 | 10.70 | 0.00 | 0.00 | 0.00 | 0.00 | 0.00 | 0.00 | 100.00 |
| 31 | cationic % | 7.09 | 40.09 | 0.44 | 0.00 | 0.92 | 0.00 | 2.38 | 0.00 | 11.75 | 19.96 | 3.76 | 0.00 | 0.00 | 0.00 | 0.85 | 2.35 | 10.41 | 0.00 | 0.00 | 0.00 | 0.00 | 0.00 | 0.00 | 100.00 |
| 32 | cationic % | 7.72 | 43.20 | 0.48 | 0.00 | 1.00 | 0.00 | 2.59 | 0.00 | 3.81 | 21.76 | 4.60 | 0.00 | 0.00 | 0.00 | 0.93 | 3.31 | 10.60 | 0.00 | 0.00 | 0.00 | 0.00 | 0.00 | 0.00 | 100.00 |
| 33 | cationic % | 7.50 | 42.45 | 0.46 | 0.00 | 0.97 | 2.91 | 2.52 | 2.91 | 3.69 | 21.12 | 3.98 | 0.00 | 0.00 | 0.00 | 0.90 | 2.49 | 11.01 | 0.00 | 0.00 | 0.00 | 0.00 | 0.00 | 0.00 | 100.00 |
| 34 | cationic % | 7.29 | 41.22 | 0.45 | 0.00 | 0.94 | 5.66 | 2.45 | 5.66 | 3.59 | 20.53 | 3.87 | 0.00 | 0.00 | 0.00 | 0.88 | 2.42 | 10.70 | 0.00 | 0.00 | 0.00 | 0.00 | 0.00 | 0.00 | 100.00 |
| 35 | cationic % | 7.60 | 42.45 | 0.46 | 0.00 | 0.97 | 0.00 | 2.52 | 2.91 | 3.69 | 21.12 | 3.98 | 0.00 | 0.00 | 0.00 | 0.90 | 2.49 | 11.01 | 0.00 | 0.00 | 0.00 | 0.00 | 0.00 | 0.00 | 100.00 |
| 36 | cationic % | 7.29 | 41.22 | 0.45 | 0.00 | 0.94 | 0.00 | 2.45 | 5.66 | 3.59 | 20.53 | 3.87 | 0.00 | 0.00 | 0.00 | 0.88 | 2.42 | 10.70 | 0.00 | 0.00 | 0.00 | 0.00 | 0.00 | 0.00 | 100.00 |
| 37 | cationic % | 7.72 | 43.20 | 0.48 | 0.00 | 1.00 | 0.00 | 0.00 | 0.00 | 6.40 | 21.76 | 4.60 | 0.00 | 0.00 | 0.00 | 0.93 | 2.56 | 11.35 | 0.00 | 0.00 | 0.00 | 0.00 | 0.00 | 0.00 | 100.00 |
| 38 | cationic % | 7.72 | 41.20 | 1.48 | 0.00 | 2.00 | 0.00 | 0.00 | 0.00 | 6.40 | 21.76 | 4.60 | 0.00 | 0.00 | 0.00 | 0.93 | 2.56 | 11.35 | 0.00 | 0.00 | 0.00 | 0.00 | 0.00 | 0.00 | 100.00 |
| 39 | cationic % | 7.50 | 40.01 | 1.48 | 0.00 | 1.94 | 0.00 | 0.00 | 0.00 | 6.21 | 21.12 | 4.47 | 0.00 | 0.00 | 0.00 | 0.90 | 2.49 | 11.01 | 0.00 | 0.00 | 0.00 | 0.00 | 0.00 | 0.00 | 100.00 |
| 40 | cationic % | 7.84 | 43.87 | 4.35 | 0.00 | 0.00 | 0.00 | 0.00 | 0.00 | 6.49 | 22.08 | 4.67 | 0.00 | 0.00 | 0.00 | 0.94 | 2.60 | 11.51 | 0.00 | 0.00 | 0.00 | 0.00 | 0.00 | 0.00 | 100.00 |
| 41 | cationic % | 7.50 | 40.02 | 0.00 | 2.91 | 1.94 | 0.00 | 0.00 | 0.00 | 6.21 | 21.12 | 4.47 | 0.00 | 0.00 | 0.00 | 0.90 | 2.49 | 11.01 | 0.00 | 0.00 | 0.00 | 0.00 | 0.00 | 0.00 | 100.00 |
| 42 | cationic % | 7.50 | 40.02 | 1.43 | 0.00 | 4.85 | 0.00 | 0.00 | 0.00 | 6.21 | 21.12 | 4.47 | 0.00 | 0.00 | 0.00 | 0.90 | 2.49 | 11.01 | 0.00 | 0.00 | 0.00 | 0.00 | 0.00 | 0.00 | 100.00 |

TABLE 1-continued

| No. | | $Si^{4+} + B^{2+}$ | $Li^+ + Na^+ + K^+$ | $La^{3+} + Gd^{3+} + Y^{3+}$ | $Ti^{4+} + Nb^{5+} + Ta^{5+} + W^{6+}$ | $B^{3+}$ | $B^{3+}/(Si^{4+} + B^{3+})$ | $(Mg^{2+} + Ca^{2+} + Sr^{2+} + Ba^{2+} + Zn^{2+})$ | $Zn^{2+}$ | | $Ti^{4+}/(Ti^{4+} + Nb^{5+})$ | $(Ti^{4+} + W^{6+})/(Ti^{4+} + Nb^{5+} + Ta^{5+} + W^{6+})$ | |
|---|---|---|---|---|---|---|---|---|---|---|---|---|---|
| 43 | cationic % | 7.50 | 41.96 | 0.00 | 0.97 | 0.00 | 6.21 | 21.12 | 4.47 | 0.00 | 0.90 | 2.49 | 11.01 | 0.00 | 0.00 | 0.00 | 100.00 |
| 44 | cationic % | 1.72 | 49.20 | 0.46 | 1.00 | 0.00 | 6.40 | 21.76 | 4.60 | 0.00 | 0.93 | 2.56 | 11.35 | 0.00 | 0.00 | 0.00 | 100.00 |
| 45 | cationic % | 0.00 | 50.92 | 0.48 | 1.00 | 0.00 | 6.40 | 21.76 | 4.60 | 0.00 | 0.93 | 2.56 | 11.35 | 0.00 | 0.00 | 0.00 | 100.00 |
| 46 | cationic % | 7.72 | 43.20 | 0.48 | 1.00 | 0.00 | 6.40 | 21.76 | 2.60 | 0.00 | 0.93 | 0.58 | 11.35 | 0.00 | 0.00 | 0.00 | 100.00 |
| 47 | cationic % | 7.72 | 43.20 | 0.48 | 1.00 | 0.00 | 6.40 | 21.76 | 4.60 | 0.00 | 0.93 | 0.58 | 13.35 | 0.00 | 0.00 | 0.00 | 100.00 |
| 48 | cationic % | 7.90 | 43.20 | 0.48 | 1.00 | 0.00 | 6.40 | 21.76 | 4.60 | 0.00 | 1.93 | 1.56 | 12.35 | 0.00 | 0.00 | 0.00 | 100.00 |
| 49 | cationic % | 7.72 | 43.20 | 0.48 | 1.00 | 0.00 | 6.40 | 21.28 | 3.60 | 2.00 | 0.93 | 0.58 | 12.35 | 1.50 | 0.00 | 0.00 | 100.00 |
| 50 | cationic % | 7.72 | 41.20 | 1.48 | 2.00 | 0.00 | 5.40 | 21.51 | 4.60 | 0.00 | 0.93 | 1.56 | 12.60 | 0.00 | 1.00 | 0.00 | 100.00 |
| 51 | cationic % | 7.72 | 44.68 | 0.00 | 0.00 | 0.00 | 5.40 | 21.51 | 4.60 | 0.00 | 0.93 | 1.56 | 12.60 | 0.00 | 0.00 | 0.00 | 100.00 |

| No. | | $Si^{4+} + B^{2+}$ | $Li^+ + Na^+ + K^+$ | $La^{3+} + Gd^{3+} + Y^{3+}$ | $Ti^{4+} + Nb^{5+} + Ta^{5+} + W^{6+}$ | $B^{3+}$ | $B^{3+}/(Si^{4+} + B^{3+})$ | $(Mg^{2+} + Ca^{2+} + Sr^{2+} + Ba^{2+} + Zn^{2+})$ | $Zn^{2+}$ | $Ti^{4+}/(Ti^{4+} + Nb^{5+})$ | $(Ti^{4+} + W^{6+})/(Ti^{4+} + Nb^{5+} + Ta^{5+} + W^{6+})$ |
|---|---|---|---|---|---|---|---|---|---|---|---|
| 1 | cationic % | 45.92 | 1.4800 | 4.10 | 0.00 | 12.91 | | 0.66 | | 0.63 | 0.35 | 0.35 |
| 2 | cationic % | 45.92 | 1.4800 | 4.10 | 0.00 | 12.91 | | 0.73 | | 0.63 | 0.35 | 0.35 |
| 3 | cationic % | 45.92 | 1.4800 | 4.10 | 0.00 | 12.91 | | 0.86 | | 0.63 | 0.35 | 0.35 |
| 4 | cationic % | 47.36 | 1.5200 | 4.23 | 0.00 | 10.21 | | 0.86 | | 0.63 | 0.16 | 0.16 |
| 5 | cationic % | 45.93 | 1.4800 | 4.10 | 0.00 | 12.91 | | 0.86 | | 0.74 | 0.35 | 0.35 |
| 6 | cationic % | 47.90 | 1.5400 | 4.10 | 0.00 | 13.46 | | 0.86 | | 0.69 | 0.35 | 0.35 |
| 7 | cationic % | 49.73 | 1.4800 | 0.00 | 0.00 | 12.91 | | 0.87 | | 0.71 | 0.35 | 0.35 |
| 8 | cationic % | 49.92 | 1.4800 | 4.10 | 0.00 | 12.91 | | 0.88 | | 0.71 | 0.12 | 0.12 |
| 9 | cationic % | 49.92 | 1.4800 | 4.10 | 0.00 | 12.91 | | 0.88 | | 0.71 | 0.51 | 0.51 |
| 10 | cationic % | 51.42 | 1.4800 | 4.10 | 0.00 | 13.91 | | 0.85 | | 0.77 | 0.18 | 0.18 |
| 11 | cationic % | 51.42 | 1.4800 | 4.10 | 0.00 | 13.91 | | 0.85 | | 0.77 | 0.18 | 0.18 |
| 12 | cationic % | 51.42 | 1.4800 | 4.10 | 0.00 | 13.91 | | 0.85 | | 0.77 | 0.18 | 0.18 |
| 13 | cationic % | 49.95 | 1.4300 | 3.98 | 0.00 | 16.41 | | 0.85 | | 0.77 | 0.33 | 0.33 |
| 14 | cationic % | 49.94 | 1.4300 | 3.98 | 0.00 | 16.42 | | 0.85 | | 0.77 | 0.15 | 0.15 |
| 15 | cationic % | 49.95 | 1.4300 | 3.98 | 0.00 | 16.41 | | 0.85 | | 0.77 | 0.18 | 0.18 |
| 16 | cationic % | 51.91 | 1.4900 | 4.14 | 0.00 | 14.04 | | 0.85 | | 0.77 | 0.18 | 0.18 |
| 17 | cationic % | 50.43 | 1.4500 | 4.02 | 0.00 | 13.63 | | 0.85 | | 0.77 | 0.18 | 0.18 |
| 18 | cationic % | 49.95 | 1.4300 | 6.89 | 0.00 | 13.50 | | 0.85 | | 0.77 | 0.18 | 0.18 |
| 19 | cationic % | 48.51 | 1.3900 | 9.53 | 0.00 | 13.12 | | 0.85 | | 0.77 | 0.18 | 0.18 |
| 20 | cationic % | 49.95 | 1.4300 | 6.89 | 0.00 | 13.50 | | 0.85 | | 0.77 | 0.18 | 0.18 |
| 21 | cationic % | 49.94 | 1.4300 | 6.90 | 0.00 | 13.50 | | 0.85 | | 0.77 | 0.18 | 0.18 |
| 22 | cationic % | 48.51 | 1.3900 | 9.53 | 0.00 | 13.12 | | 0.85 | | 0.77 | 0.18 | 0.18 |
| 23 | cationic % | 51.42 | 1.4800 | 4.10 | 0.00 | 13.91 | | 0.85 | | 0.77 | 0.18 | 0.18 |
| 24 | cationic % | 51.42 | 1.4800 | 4.10 | 0.00 | 13.91 | | 0.85 | | 0.77 | 0.18 | 0.18 |
| 25 | cationic % | 53.02 | 1.5200 | 4.23 | 0.00 | 14.34 | | 0.86 | | 0.75 | 0.18 | 0.18 |
| 26 | cationic % | 54.71 | 1.5700 | 4.36 | 0.00 | 14.80 | | 0.85 | | 0.71 | 0.18 | 0.18 |
| 27 | cationic % | 48.51 | 1.3900 | 3.87 | 0.00 | 13.12 | | 0.85 | | 0.81 | 0.18 | 0.18 |
| 28 | cationic % | 47.18 | 1.3600 | 3.76 | 0.00 | 12.76 | | 0.85 | | 0.83 | 0.18 | 0.18 |
| 29 | cationic % | 49.94 | 1.4300 | 3.98 | 0.00 | 13.50 | | 0.85 | | 0.70 | 0.18 | 0.18 |
| 30 | cationic % | 48.51 | 1.3900 | 3.87 | 0.00 | 13.12 | | 0.85 | | 0.64 | 0.18 | 0.18 |
| 31 | cationic % | 47.18 | 1.3600 | 3.76 | 0.00 | 12.76 | | 0.85 | | 0.59 | 0.18 | 0.18 |
| 32 | cationic % | 50.92 | 1.4800 | 4.60 | 0.00 | 13.91 | | 0.85 | | 0.77 | 0.24 | 0.24 |
| 33 | cationic % | 49.95 | 1.4300 | 3.98 | 0.00 | 13.50 | | 0.85 | | 0.70 | 0.18 | 0.18 |
| 34 | cationic % | 48.51 | 1.3900 | 3.87 | 0.00 | 13.12 | | 0.85 | | 0.64 | 0.18 | 0.18 |

TABLE 1-continued

| No. | cationic % | | | | | | | | Tg (° C.) | Ts (° C.) | LT (° C.) | λ70 (nm) | λ5 (nm) |
|---|---|---|---|---|---|---|---|---|---|---|---|---|---|
| 35 | cationic % | 49.95 | 1.4300 | 3.98 | | | 13.50 | 0.70 | | | | | 0.18 |
| 36 | cationic % | 48.51 | 1.3900 | 3.87 | | | 13.12 | 0.64 | | | | | 0.18 |
| 37 | cationic % | 50.92 | 1.4800 | 4.60 | | | 13.91 | 0.77 | | | | | 0.18 |
| 38 | cationic % | 48.92 | 3.4800 | 4.60 | | | 13.50 | 0.77 | | | | | 0.18 |
| 39 | cationic % | 47.51 | 6.2900 | 4.47 | | | 14.11 | 0.77 | | | | | 0.18 |
| 40 | cationic % | 51.71 | 0.0000 | 4.67 | | | 13.50 | 0.77 | | | | | 0.18 |
| 41 | cationic % | 47.52 | 6.2800 | 4.47 | | | 13.50 | 0.77 | | | | | 0.18 |
| 42 | cationic % | 47.52 | 6.2800 | 4.47 | | | 13.50 | 0.77 | | | | | 0.18 |
| 43 | cationic % | 49.46 | 1.4300 | 4.60 | | | 13.91 | 0.77 | | | | | 0.18 |
| 44 | cationic % | 50.92 | 1.4800 | 4.60 | | | 13.91 | 0.77 | | | | | 0.18 |
| 45 | cationic % | 50.92 | 1.4800 | 4.60 | | | 13.91 | 0.97 | | | | | 0.18 |
| 46 | cationic % | 50.92 | 1.4800 | 2.60 | | | 13.91 | 1.00 | | | | | 0.18 |
| 47 | cationic % | 50.92 | 1.4800 | 4.60 | | | 13.91 | 0.77 | | | | | 0.04 |
| 48 | cationic % | 50.92 | 1.4800 | 3.60 | | | 13.91 | 0.77 | | | | | 0.11 |
| 49 | cationic % | 50.92 | 1.4800 | 4.60 | | | 14.41 | 0.77 | | | | | 0.04 |
| 50 | cationic % | 48.92 | 3.4800 | 4.60 | | | 14.16 | 0.80 | | | | | 0.11 |
| 51 | cationic % | 52.40 | 0.0000 | 4.60 | | | 14.16 | 0.80 | | | | | 0.11 |

| No. | nd | vd | Pg,F | ΔPg,f | Specific gravity | Tg (° C.) | Ts (° C.) | LT (° C.) | λ70 (nm) | λ5 (nm) |
|---|---|---|---|---|---|---|---|---|---|---|
| 1 | 1.79126 | 34.86 | 0.586 | 0.000 | 3.94 | 576 | 627 | Less than 1050° C. | 386 | 350 |
| 2 | 1.80498 | 34.34 | 0.587 | 0.001 | 3.99 | 561 | 608 | Less than 1030° C. | 391 | 351 |
| 3 | 1.81444 | 33.96 | 0.588 | 0.001 | 4.02 | 549 | 594 | Less than 1020° C. | 394 | 351 |
| 4 | 1.79159 | 36.87 | 0.582 | 0.000 | 4.03 | 547 | 591 | Less than 1020° C. | 377 | 342 |
| 5 | 1.81757 | 33.37 | 0.590 | 0.002 | 3.96 | 546 | 590 | Less than 1050° C. | 399 | 355 |
| 6 | 1.79958 | 32.92 | 0.595 | 0.006 | 3.79 | 541 | 584 | Less than 1050° C. | 399 | 355 |
| 7 | 1.80713 | 33.67 | 0.591 | 0.003 | 3.85 | 555 | 599 | Less than 1030° C. | 402 | 357 |
| 8 | 1.80719 | 34.39 | 0.586 | 0.000 | 4.03 | 553 | 598 | Less than 1020° C. | 387 | 346 |
| 9 | 1.80741 | 33.38 | 0.593 | 0.005 | 3.96 | 554 | 598 | Less than 1000° C. | 407 | 359 |
| 10 | 1.80845 | 33.26 | 0.589 | 0.001 | 4.00 | 557 | 602 | Less than 1020° C. | 396 | 352 |
| 11 | 1.80048 | 33.49 | 0.589 | 0.001 | 3.97 | 563 | 609 | Less than 1020° C. | 396 | 352 |
| 12 | 1.80425 | 33.26 | 0.589 | 0.001 | 3.99 | 560 | 607 | Less than 1020° C. | 396 | 352 |
| 13 | 1.81491 | 32.03 | 0.595 | 0.004 | 4.13 | 560 | 602 | Less than 1050° C. | 409 | 359 |
| 14 | 1.82490 | 31.53 | 0.594 | 0.002 | 4.02 | 563 | 607 | Less than 1050° C. | 406 | 357 |
| 15 | 1.82149 | 32.23 | 0.592 | 0.002 | 4.16 | 568 | 611 | Less than 1100° C. | 397 | 355 |
| 16 | 1.79865 | 33.40 | 0.590 | 0.002 | 3.96 | 561 | 605 | Less than 1050° C. | 396 | 353 |
| 17 | 1.81262 | 33.22 | 0.590 | 0.001 | 4.02 | 567 | 611 | Less than 1050° C. | 397 | 352 |
| 18 | 1.81354 | 33.95 | 0.590 | 0.003 | 4.16 | 572 | 613 | Less than 1100° C. | 393 | 352 |
| 19 | 1.82295 | 34.36 | 0.585 | −0.002 | 4.33 | 577 | 622 | Less than 1100° C. | 393 | 350 |
| 20 | 1.80993 | 33.97 | 0.588 | 0.001 | 4.05 | 570 | 614 | Less than 1100° C. | 392 | 352 |
| 21 | 1.81516 | 33.95 | 0.587 | 0.000 | 4.12 | 569 | 613 | Less than 1050° C. | 395 | 350 |
| 22 | 1.82598 | 34.44 | 0.588 | 0.002 | 4.24 | 573 | 617 | Less than 1050° C. | 392 | 348 |
| 23 | 1.80177 | 33.38 | 0.590 | 0.001 | 4.01 | 565 | 608 | Less than 1050° C. | 397 | 353 |
| 24 | 1.79930 | 33.39 | 0.590 | 0.002 | 3.93 | 566 | 603 | Less than 1100° C. | 395 | 353 |
| 25 | 1.80405 | 33.32 | 0.592 | 0.004 | 3.93 | 566 | 611 | Less than 1050° C. | 397 | 355 |
| 26 | 1.79873 | 32.91 | 0.590 | 0.001 | 3.88 | 570 | 614 | Less than 1050° C. | 399 | 356 |
| 27 | 1.80628 | 33.62 | 0.588 | 0.001 | 4.06 | 557 | 597 | Less than 1050° C. | 391 | 352 |

TABLE 1-continued

| | | | | | | | | |
|---|---|---|---|---|---|---|---|---|
| 28 | 1.80799 | 33.72 | 0.590 | 0.002 | 4.10 | 553 | 596 | Less than 1050° C. | 393 | 352 |
| 29 | 1.80435 | 33.97 | 0.590 | 0.003 | 4.08 | 563 | 606 | Less than 1050° C. | 391 | 351 |
| 30 | 1.80489 | 34.44 | 0.586 | -0.001 | 4.17 | 561 | 604 | Less than 1050° C. | 388 | 348 |
| 31 | 1.80404 | 34.94 | 0.586 | 0.001 | 4.25 | 559 | 602 | Less than 1050° C. | 386 | 346 |
| 32 | 1.80612 | 33.26 | 0.589 | 0.001 | 4.00 | 565 | 608 | Less than 1010° C. | 398 | 353 |
| 33 | 1.79969 | 33.73 | 0.587 | -0.001 | 3.96 | 566 | 610 | Less than 1050° C. | 401 | 353 |
| 34 | 1.79657 | 34.19 | 0.588 | 0.001 | 3.95 | 568 | 610 | Less than 1050° C. | 404 | 354 |
| 35 | 1.80274 | 34.00 | 0.590 | 0.002 | 4.03 | 564 | 607 | Less than 1050° C. | 390 | 349 |
| 36 | 1.80189 | 34.48 | 0.586 | 0.000 | 4.08 | 564 | 608 | Less than 1050° C. | 387 | 348 |
| 37 | 1.80709 | 33.52 | 0.590 | 0.002 | 4.10 | 562 | 604 | Less than 990° C. | 395 | 351 |
| 38 | 1.80685 | 33.38 | 0.590 | 0.001 | 4.10 | 551 | 595 | Less than 1000° C. | 392 | 351 |
| 39 | 1.80560 | 33.58 | 0.587 | -0.001 | 4.09 | 532 | 576 | Less than 1030° C. | 392 | 350 |
| 40 | 1.81311 | 33.27 | 0.590 | 0.002 | 4.11 | 572 | 614 | Less than 1030° C. | 402 | 353 |
| 41 | 1.80025 | 33.48 | 0.585 | -0.003 | 4.07 | 533 | 581 | Less than 1050° C. | 393 | 348 |
| 42 | 1.79484 | 33.68 | 0.590 | 0.002 | 4.04 | 541 | 587 | Less than 1050° C. | 394 | 348 |
| 43 | 1.79855 | 33.84 | 0.582 | -0.006 | 4.05 | 563 | 608 | Less than 1050° C. | 399 | 351 |
| 44 | 1.81738 | 33.17 | 0.589 | 0.000 | 4.14 | 553 | 593 | Less than 1000° C. | 400 | 353 |
| 45 | 1.82023 | 33.02 | 0.590 | 0.000 | 4.15 | 550 | 590 | Less than 1000° C. | 401 | 354 |
| 46 | 1.80423 | 33.43 | 0.590 | 0.002 | 4.15 | 565 | 608 | Less than 1080° C. | 394 | 353 |
| 47 | 1.80775 | 33.83 | 0.589 | 0.001 | 4.13 | 562 | 605 | Less than 1030° C. | 386 | 345 |
| 48 | 1.80832 | 33.37 | 0.589 | 0.001 | 4.09 | 562 | 607 | Less than 1030° C. | 369 | 349 |
| 49 | 1.80681 | 33.66 | 0.589 | 0.001 | 4.19 | 561 | 604 | Less than 1020° C. | 391 | 350 |
| 50 | 1.80565 | 33.32 | 0.588 | 0.000 | 4.07 | 550 | 595 | Less than 1000° C. | 393 | 348 |
| 51 | 1.80746 | 33.41 | 0.589 | 0.001 | 4.07 | 572 | 613 | Less than 1050° C. | 396 | 351 |

The various characteristics of the optical glasses were measured by the following methods.

(1) Refractive Indexes nd, ng, nF, nc, and the Abbé Number vd

The refractive indexes nd, ng, nF, and nc, and the Abbé number vd of glasses obtained by lowering the temperature at a rate of 30° C./hour were measured by the refractive index measurement standards of the Japan Optical Glass Industry Association.

(2) Liquidus Temperature LT

The glass was maintained for 2 hours in a furnace heated to a prescribed temperature and cooled. The interior of the glass was then observed by an optical microscope at 100× magnification and the liquidus temperature was determined from the presence or absence of crystals.

(3) Glass Transition Temperature Tg and Yield Point Ts

Measurement was conducted at a rate of temperature increase of 4° C./minute using a thermomechanical analysis apparatus made by Rigaku Corporation.

(4) Partial Dispersion Ratio Pg,F

The Pg,F was calculated from the refractive indexes ng, nF, and nc.

(5) Difference from the Normal Line of the Partial Dispersion Ratio, ΔPg,F

The ΔPg,F was calculated from the partial dispersion ratio Pg,F(0) on the normal line calculated from the Abbé number vd and the partial dispersion ratio Pg,F.

(6) Specific Gravity

The specific gravity was measured by Archimedes' method.

(7) λ70, λ5

The λ70 and λ5 were obtained by measuring the spectral transmittance with a spectrophotometer.

2. Preparation of Press-Molding Glass Material (1)

The formed glass articles comprised of various glasses fabricated in 1. above were each cut into multiple pieces of glass. Each piece of glass was ground and polished to prepare a press-molding glass material.

3. Preparation of Press-Molding Glass Material (2)

Glass melts were prepared by the same manner as in 1. above and caused to flow out of pipes. The tip of the glass melt flow that flowed out was separated to obtain a glass melt gob. The glass melt gob was molded while being floated with blown air on a mold to prepare a press-molding glass material. The press-molding glass materials comprised of the various optical glasses indicated in Table 1 were thus prepared.

Alternatively, the glass melt gob can be press molded on a mold and then the press molded glass can be cooled while being floated on the mold to prepare a glass material.

4. Preparation of Optical Element

Each of the press-molding glass materials prepared in 2. and 3. above was separately introduced into a pressing mold, the glass material and the pressing mold were heated together, the glass material was softened, and precision press molding was conducted to prepare an aspherical lens.

Each of the press-molding glass materials prepared in 2. and 3. above was heated, softened, and introduced into a preheated pressing mold. Precision press molding was conducted to prepare an aspherical lens.

In all of the forms, high-quality optical elements were obtained by precision press molding.

5. Preparation of Image Pickup Device and Optical System

The various lenses prepared in 4. above were used to prepare interchangeable lenses for single lens reflex cameras with built-in lenses.

The various lenses prepared in 4. above were also used to prepare various optical systems for compact digital cameras and modularized. Image sensors such as CCDs and CMOSs were then mounted into these optical systems and modularized.

By employing the various lenses prepared in 4., it was possible to obtain highly functional, compact optical systems, interchangeable lenses, lens modules, and pickup devices. By combining the lenses prepared in 4. above with the high refractive index, high dispersion optical glass lenses, it was possible to obtain various optical systems conducting high-order chromatic aberration correction and image pickup devices equipped with these optical systems.

The optical glass of the present invention has high refractive index characteristics and good precision press moldability, a low glass transition temperature, and is suited to precision press molding. It is also suited to high-order chromatic aberration correction and use in preparing press-molding glass materials and optical elements.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. Optical glass, which is oxide glass comprising, denoted as cation percentages:

$Si^{4+}$ 0 to 30%;
$B^{3+}$ 15 to 60%;
$Li^+$ 0 to 10%;
$Na^+$ 0 to 10%;
$K^+$ 0 to 15%;
$Mg^{2+}$ 0 to 20%;
$Ca^{2+}$ 0 to 15%;
$Sr^{2+}$ 0 to 20%;
$Ba^{2+}$ 0 to 20%;
$Zn^{2+}$ 13 to 40%;
$La^{3+}$ 0 to 11%;
$Gd^{3+}$ 0 to 10%;
$Y^{3+}$ 0 to 6%;
$Yb^{3+}$ 0 to 6%;
$Zr^{4+}$ 0 to 5%;
$Ti^{4+}$ 0 to 7%;
$Nb^{5+}$ 2 to 20%;
$Ta^{5+}$ 0 to 5%;
$W^{6+}$ 0 to 10%;
$Te^{4+}$ 0 to 5%;

$Ge^{4+}$ 0 to 5%;
$Bi^{3+}$ 0 to 5%; and
$Al^{3+}$ 0 to 5%;
  wherein
    a combined content of $Si^{4+}$ and $B^{3+}$ ranges from 35 to 65%;
  a cation ratio of a content of $B^{3+}$ to the combined content of $Si^{4+}$ and $B^{3+}$, $B^{3+}/(Si^{4+}+B^{3+})$, ranges from 0.3 to 1;
    a combined content of $Li^+$, $Na^+$, and $K^+$ ranges from 0 to 20%;
    a cation ratio of a content of $Zn^{2+}$ to a combined content of $Mg^{2+}$, $Ca^{2+}$, $Sr^{2+}$, $Ba^{2+}$, and $Zn^{2+}$, $Zn^{2+}/(Mg^{2+}+Ca^{2+}Sr^{2+}+Ba^{2+}+Zn^{2+})$, ranges from 0.30 to 1;
    a combined content of $La^{3+}$, $Gd^{3+}$, and $Y^{3+}$ ranges from 0 to 20%;
    a combined content of $Ti^{4+}$, $Nb^{5+}$, $Ta^{5+}$, and $W^{6+}$ ranges from 10 to 20%;
    a cation ratio of the content of $Ti^{4+}$ to the combined content of $Ti^{4+}$ and $Nb^{5+}$ ($Ti^{4+}/(Ti^{4+}+Nb^{5+})$) ranges from 0 to 0.20; and
    a cation ratio of the combined content of $Ti^{4+}$ and $W^{6+}$ to the combined content of $Ti^{4+}$, $Nb^{5+}$, $Ta^{5+}$, and $W^{6+}$ (($Ti^{4+}+W^{6+})/(Ti^{4+}+Nb^{5+}+Ta^{5+}+W^{6+}$)) ranges from 0 to 0.20, and
    comprising no Pb, with a refractive index nd ranging from 1.750 to 1.850, an Abbé number vd ranging from 29.0 to 40.0, and a glass transition temperature of less than 630° C.

2. The optical glass according to claim 1, which has a partial dispersion ratio, Pg,F, of equal to or lower than 0.600, the partial dispersion ratio being denoted as (ng−nF)/(nFnc) with a refractive index ng at a g line, nF at an F line, and nc at a c line.

3. The optical glass according to claim 1, which has a deviation, ΔPg,F, of a partial dispersion ratio, Pg,F, of equal to or lower than 0.02, wherein the ΔPg,F is calculated by the following equation:

$$\Delta Pg,F = Pg,F + (0.0018 \times vd) - 0.6483$$

and in the equation, Pg,F is a partial dispersion ratio denoted as (ng−nF)/(nF−nc) with a refractive index ng at a g line, nF at an F line, and nc at a c line, and vd is an Abbú number.

4. The optical glass according to claim 1, which has a specific gravity of equal to or lower than 4.5.

5. The optical glass according to claim 1, which has a liquidus temperature of lower than 1,100° C.

6. The optical glass according to claim 1, the wavelength λ70 of which is equal to or lower than 450 nm, the λ70 being a wavelength at which light transmittance over a wavelength range of 280 to 700 nm is 70%.

7. The optical glass according to claim 1, the wavelength λ5 of which is equal to or lower than 370 nm, the λ5 being a wavelength at which light transmittance over a wavelength range of 280 to 700 nm is 5%.

8. A press-molding glass material, which is comprised of the optical glass according to claim 1.

9. An optical element, which is comprised of the optical glass according to claim 1.

10. A method of manufacturing an optical element, which comprises:
  heating and precision press molding with a pressing mold the press-molding glass material according to claim 8.

* * * * *